United States Patent
Duell et al.

(10) Patent No.: US 8,444,365 B2
(45) Date of Patent: May 21, 2013

(54) ROLL OFF HOIST WITH HINGED TAIL AND HYDRAULIC REEVING SYSTEM

(75) Inventors: Charles A. Duell, Crestline, OH (US); Richard T. Williams, Lewis Center, OH (US)

(73) Assignee: The Heil Co., Chattanooga, TN (US)

( * ) Notice: Subject to any disclaimer, the term of this patent is extended or adjusted under 35 U.S.C. 154(b) by 348 days.

(21) Appl. No.: 12/476,767

(22) Filed: Jun. 2, 2009

(65) Prior Publication Data

US 2010/0303595 A1    Dec. 2, 2010

(51) Int. Cl.
*B60P 1/22* (2006.01)

(52) U.S. Cl.
USPC .............................. 414/494; 414/500; 414/538

(58) Field of Classification Search
USPC .......................................... 414/494, 500, 538
See application file for complete search history.

(56) References Cited

U.S. PATENT DOCUMENTS

| | | | |
|---|---|---|---|
| 2,963,185 A * | 12/1960 | Jones et al. ................... | 414/494 |
| 3,130,847 A | 4/1964 | Dempster et al. | |
| 3,272,546 A | 9/1966 | Cooley | |
| 3,485,400 A | 12/1969 | Pewthers | |
| 3,786,949 A | 1/1974 | Sutton | |
| 3,858,927 A | 1/1975 | Sutton | |
| 3,874,537 A | 4/1975 | Kou | |
| 3,964,625 A | 6/1976 | Wirz | |
| 3,987,919 A * | 10/1976 | Weeks et al. .................. | 414/471 |
| 4,133,439 A | 1/1979 | Goranson | |
| 4,153,169 A | 5/1979 | Cipkowski | |
| 4,204,793 A | 5/1980 | Lemaire | |
| 4,290,726 A | 9/1981 | Sutela et al. | |
| 4,350,469 A | 9/1982 | Corompt | |
| 4,645,405 A | 2/1987 | Cambiano | |
| 4,802,811 A | 2/1989 | Nijenhuis | |
| 4,915,567 A | 4/1990 | Ellingsen | |
| 4,986,719 A | 1/1991 | Galbreath | |
| 5,094,583 A * | 3/1992 | Bills, Jr. et al. ............... | 414/537 |
| 5,163,800 A | 11/1992 | Raisio | |
| 5,192,189 A | 3/1993 | Murata et al. | |
| 5,193,968 A | 3/1993 | Hicks | |
| 5,203,668 A | 4/1993 | Marmur | |
| 5,460,473 A | 10/1995 | LaMora et al. | |
| 5,601,393 A | 2/1997 | Waldschmitt | |
| 5,921,742 A * | 7/1999 | Gearhart ....................... | 414/480 |
| 6,354,787 B1 * | 3/2002 | O'Daniel ....................... | 414/494 |
| 6,558,104 B1 | 5/2003 | Vlaanderen | |
| 7,377,592 B2 | 5/2008 | Kraenzle | |
| 7,568,881 B1 * | 8/2009 | Collins ......................... | 414/812 |

(Continued)

FOREIGN PATENT DOCUMENTS

| | | |
|---|---|---|
| CA | 2131356 | 3/1996 |
| EP | 0564 403 A1 | 10/1993 |
| EP | 0811525 A1 | 12/1997 |
| WO | WO 90/14250 | 11/1990 |

*Primary Examiner* — James Keenan (74) *Attorney, Agent, or Firm* — Harness, Dickey & Pierce, P.L.C.

(57) ABSTRACT

A container handling system and method for a wheeled transport vehicle is disclosed that is capable of loading and unloading containers, particularly in locations where the overhead height is limited. A hinged tail member at the rear end of the elongated body (a/k/a tilt frame member) is rotated adjacent the ground allowing the containers to be loaded and unloaded without rotating the tilt frame to its maximum height. A cable reeving arrangement, such as a dual reeving arrangement, can be utilized to load and unload the containers.

29 Claims, 7 Drawing Sheets

U.S. PATENT DOCUMENTS

| | | |
|---|---|---|
| 8,029,228 B2 * | 10/2011 | Marmur .................. 414/478 |
| 2002/0146306 A1 | 10/2002 | Morrell |
| 2004/0156701 A1 | 8/2004 | Scranton et al. |
| 2009/0110523 A1 * | 4/2009 | Geoffrion et al. ............ 414/480 |
| 2009/0324374 A1 * | 12/2009 | De Carli .................. 414/478 |

* cited by examiner

ROLL OFF HOIST WITH HINGED TAIL AND HYDRAULIC REEVING SYSTEM

FIELD OF THE INVENTION

This invention relates to a container handling system for a vehicle, more specifically it relates to a system and method for loading and unloading containers on and off wheeled vehicles.

BACKGROUND OF THE INVENTION

The art typically refers to systems for loading and unloading containers as "hook lift" systems and "cable hoist" systems. These systems have been extensively employed for the transport of various materials in the containers and have a pivotal tilt frame attached to the vehicle. In the usual case, containers are loaded or unloaded upon the bed of the truck or vehicle utilizing the hook lift system or the cable hoist system. One typical use for such systems is in the picking up and hauling of refuse. An open top or closed top container is typically delivered to, or picked up from, a point of use with either of these systems.

Cable hoist systems typically use a cable reeving system like, for example, the one shown in U.S. Pat. No. 5,460,473. In this type of a system, hydraulic cylinders are typically used to move the cable about a fixed sheave attached to the vehicle hoist frame. In the fully retracted position, the cable, which is wrapped around sheaves connected to the cylinders, is at its longest affective length and can be connected to the front end of a container located on the ground. As the cylinders extend, the effective length of the cable continuously shortens as it wraps around the cylinder sheaves and then finally around the sheave attached at the front end of the hoist frame. As the effective length of the cable gets shorter, the container is pulled up and onto the vehicle, which is usually in a tilted position to facilitate loading and unloading of the container.

With the tilt frame members, the frame upon which the containers are placed is pivotally connected near or at the distal end of the vehicle frame. Hydraulic cylinders are used to raise and lower the tilt frame relative to the vehicle frame. The tilt frame is actuated during loading and unloading of containers to assist in these procedures.

Some tilt frames on the transport vehicles have extendable end portions which aid in loading and unloading containers in a more efficient manner. See, for example, U.S. Pat. No. 4,986,719. The distal (rear) end of the frame has a moveable portion which telescopically slides out of the frame to extend the length of the frame. These systems, although useful, have durability and strength problems.

One problem with existing tilt frame vehicle systems is that the tilt frame on the vehicle typically must be raised to a significant height for the loading and unloading of the containers and thus these systems have difficulty being used indoors or in situations where the ceiling height is low. The vehicles with extendable end portions may be used in such circumstances, but are not sufficiently durable and require more floor space for loading and unloading.

Needs therefore exist for new types of loading and unloading systems that can load, transport, and unload all types of containers, and in all types of situations and with all types of container loads, regardless of the overhead clearance.

The present invention solves these problems by providing a tilt frame transport vehicle with an end portion that contains a hinged and hydraulically actuated end member (called a "tail"). The hinged end member (tail) allows loading and unloading of containers without the necessity of raising the tilt frame to an extreme angle. Some containers can be loaded and unloaded without raising the tilt frame at all.

SUMMARY OF THE INVENTION

It is one object of the present invention to provide an improved system for loading and unloading containers regardless of the clearance height. It is another object of the present invention to provide an improved system for loading and unloading containers which is faster than conventional tilt frame systems and which has a smaller footprint during use which allows it to be used in more situations.

One preferred embodiment of the invention includes an elongated body (a/k/a "tilt frame") that is attached to the wheeled vehicle's frame. The elongated body has a dual hydraulic cylinder reeving system and a hinged tail member. A pulley member is positioned at the pivot axis for the hinged tail member in order to allow the cable to more easily load and unload containers onto and off the tilt frame member.

The elongated body (or tilt frame) is pivotally connected to the vehicle chassis or frame near the rear end of the frame. One or more hydraulic cylinders are pivotally attached to a support member located near the front portion of the vehicle frame and to the elongated body near the front end, such that when the cylinder is fully retracted the elongated body is in a horizontal position parallel to and adjacent to the vehicle frame. When this cylinder begins to extend, the front end of the elongated body moves (tilts) upward in an arcuate path while the distal rear end of the body moves downward. The pivot point of the elongated body is typically the connection between the vehicle frame and the elongated body and is typically located near the rear of the body member. Raising the front end of the body while lowering the rear end facilitates loading and unloading of the containers. The tilt frame may also contain a number of rollers or other friction reducing surfaces positioned along its length which also makes loading and unloading easier by reducing the friction between the container bottom and the tilt frame.

When the dual hydraulic cylinder reeving arrangement mechanism is used on the vehicle, one end of the cable is fixedly attached near or at the front end of the tilt frame member. The other (free) end of the cable is passed around several sheaves that are part of the reeving arrangement. When the hydraulic cylinders of the reeving arrangement are retracted, the free end of the cable is of sufficient length that it can be attached to a container on the ground. The free end of the cable may contain a hook, latch, clasp or other suitable device to allow it to be removably connected to the container. Once the cable is connected to the container, the vehicle operator operates the hydraulic cylinders of the reeving arrangement which causes them to extend and the cable to shorten. The reduction in the length of the free end of the cable pulls the container onto the elongated body. Once the hydraulic cylinders are fully retracted, the container is necessarily pulled all the way onto the body. Once the containers is positioned on the elongated body member (tilt frame), the cylinder(s) that lift the tilt frame member are retracted, lowering the tilt frame and container to a horizontal or starting position. Again, there is no requirement that each cylinder or set of cylinders be operated in serial fashion and it is well within the scope of the invention that the cylinders and steps mentioned above may be operated simultaneously.

During the loading and unloading of containers, the hinged tail member on the elongated body (tilt frame) is rotated and pivoted independently. One or more hydraulic cylinders are provided to rotate the hinged end (a k/a "tail portion"). With this embodiment, it is not necessary to tilt the elongated body to the same extent, or the conventional amount. Instead, the hinging of the tail portion can position the distal end of the elongated body adjacent the ground or other surface and allow the container to be loaded onto, or unloaded from, the elongated body and vehicle. The hinged tail member is preferably designed to have the same load strength of the tilt frame member. In addition, the hinged tail member has comparable lifting strength to the tilt frame which is independent of the reeving during loading.

The hinged tail member can be wider than the tilt frame member, and the hinged tail member could share a common pivot with the hinged tilt frame. In addition, for some types of containers, the hinged tail can be lowered for pick up and delivery of the containers without the necessity of lifting or tilting the tilt frame.

In another embodiment, a single cylinder reeving arrangement is used to operate the cable and thus load and unload the containers from the vehicle.

Further features, benefits and advantages of the inventive process and system will become apparent from the following description of embodiments of the invention, particularly when viewed in combination with the accompanying drawings and appended claims.

DETAILED DESCRIPTION OF THE PREFERRED EMBODIMENTS

Figure 1:
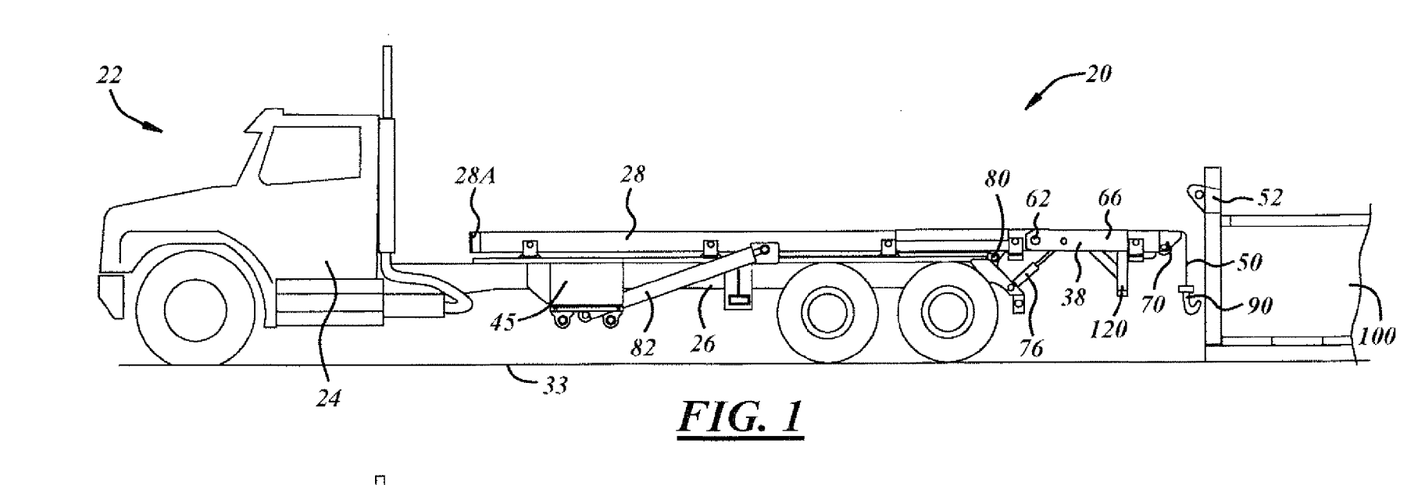
FIG. 1 is a side view of a loading and unloading system in accordance with an embodiment of the invention.

A preferred embodiment of the present invention is shown in FIG. 1 and referred to generally by the reference numeral 20. The system 20 is adapted to be mounted on a vehicle 22 which typically consists of a cab portion 24 and a chassis or vehicle frame 26. The invention includes an elongated body 28, also known as a "tilt frame," which is adapted to be mounted on the frame 26 of the vehicle 22.

Figures 3, 4:
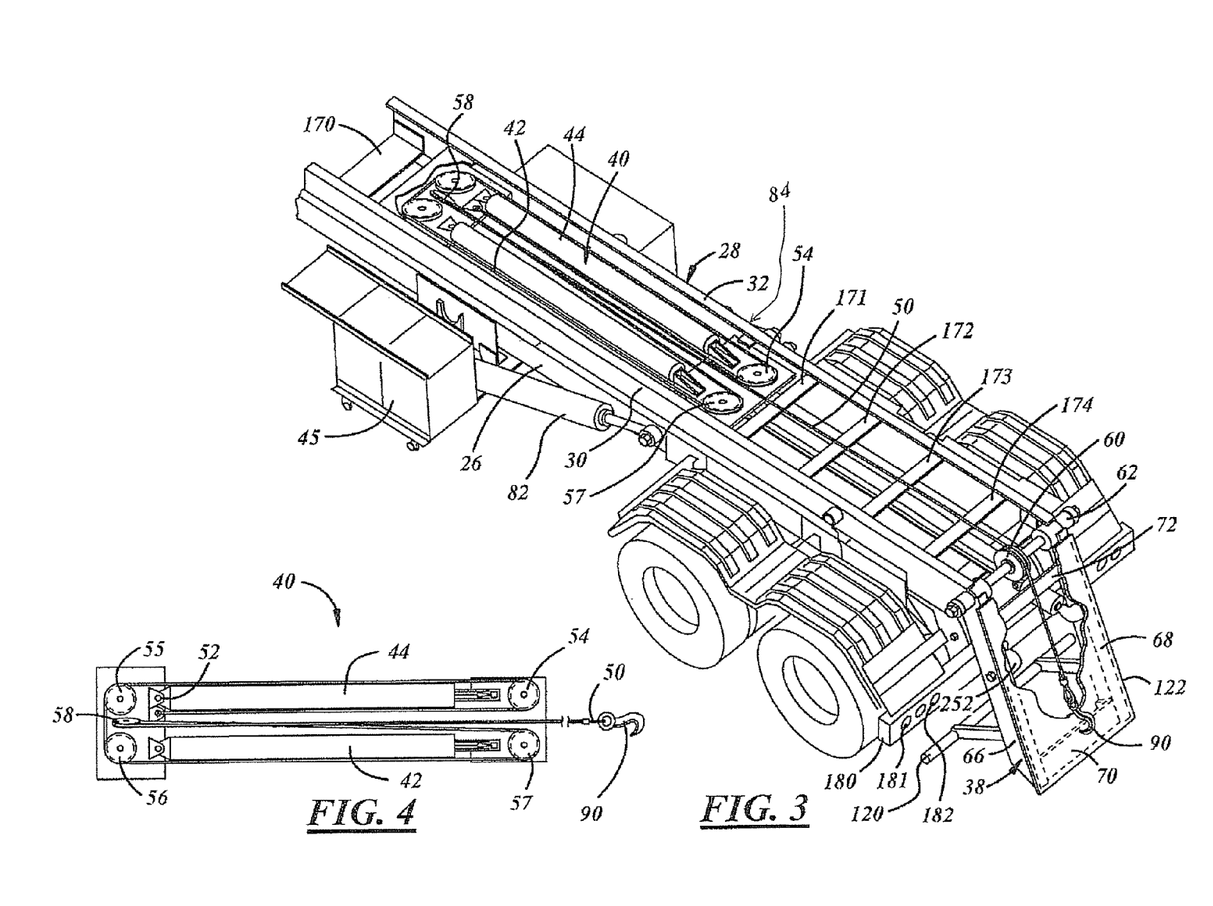
FIG. 3 is a perspective view of the embodiment shown in FIGS. 1 and 2 with the hinged tail member in its lowered position.
FIG. 4 illustrates the dual hydraulic cylinder reeving arrangement used with the embodiment shown in FIG. 3.

As shown in FIG. 3, the tilt frame 28 includes a pair of side rails 30 and 32, a dual hydraulic cylinder reeving arrangement 40, and a hinged tail or end member 38. In this regard, the use of the term "container" is not meant to be limiting. Although it is anticipated that the invention will be used primarily on refuse containers, it can be used to load or unload virtually any structure or object known today, including storage containers and the like.

A pulley or sheave 60 is positioned on the tilt frame where the hinged tail member rotates to accommodate the cable movement. This allows the cable 50 to easily follow along in the plane of the hinged tail member when it is rotated to its down or lowered position.

The dual cylinder reeving arrangement 40 is utilized to load and unload containers from the vehicles. Such an arrangement is shown in FIG. 4. In this arrangement, two hydraulic cylinders 42, 44 are provided on the tilt frame, each with two sheaves (one on either end). The cable 50 is affixed to a front end 52 of one of the two hydraulic cylinders, or to the front structure of the elongated body and the cable is routed through pulley (sheave) members 54, 55, 56, 57 and 58 before being led out of the area of the two cylinders and into the position to be used to raise or lower a container.

The tail member 38 is rotatably connected to the rear ends of the side rail members 30 and 32 on the tilt frame member 28. A pivot mechanism 62 is used to rotatably attach the tail member 38 to the end of the tilt frame member 28. It is also possible for the hinged tail member and tilt frame member to share a common pivot mechanism.

The hinged tail member 38 includes a pair of side rail members 66 and 68 as well as a rear end cross brace member 70. An optional front cross member 72 could also be utilized.

A hydraulic cylinder 76 is used to rotate the hinged tail member 38. (A pair of hydraulic cylinders could also be utilized.) The hydraulic cylinder 76 is attached at one end to the tilt frame mechanism 28 or the vehicle frame 26 and attached at the other end to the hinged tail member 38.

As shown in the drawings, the hydraulic cylinder 76 (or pair of cylinders) allows the hinged tail member 38 to be moved from a position in alignment with the tilt frame member 28 to a position where the end cross brace member 70 is positioned on or near the ground or other surface 33. In the lowered position, the hinged tail member 38 can also act as a stabilizer to prevent heavy loads from lifting the front of the vehicle when they are being loaded and unloaded. The rear cross brace member 70 preferably contains a roller member 71 which is used to assist in loading and unloading containers from the vehicle.

The tilt frame member 28 is pivotally attached to the bed or frame 26 of the vehicle 22 in a conventional manner. The pivot mechanism is generally referred to by the reference number 80. A pair of hydraulic cylinders 82 and 84 are used to rotate (tilt) the tilt frame member 28 relative to the bed or frame 26 in a manner shown in the drawings. In this regard, the tilting of the elongated body or tilt frame member 28 is conventional with container vehicles of this type and it is not believed necessary to describe the tilting and pivoting mechanism in further detail herein. The hydraulic fluid for the hydraulic cylinders used with the invention is typically contained in a fluid tank box 45. The control valve 46 (FIG. 11) for the hydraulic cylinders are typically positioned adjacent the tank box 45.

As indicated, the free end of the cable 50 is passed around the sheaves (a/k/a pulley members) in the reeving arrangement 40. When the hydraulic cylinders 42 and 44 are retracted to their shortest length, the free end of the cable 50 is of sufficient length that can be attached to a container positioned behind, or at the rear of, the vehicle 22. The free end of the cable 50 may contain any conventional mechanism for attachment to a container, such as a latch, clasp, or hook 90.

Figure 2:
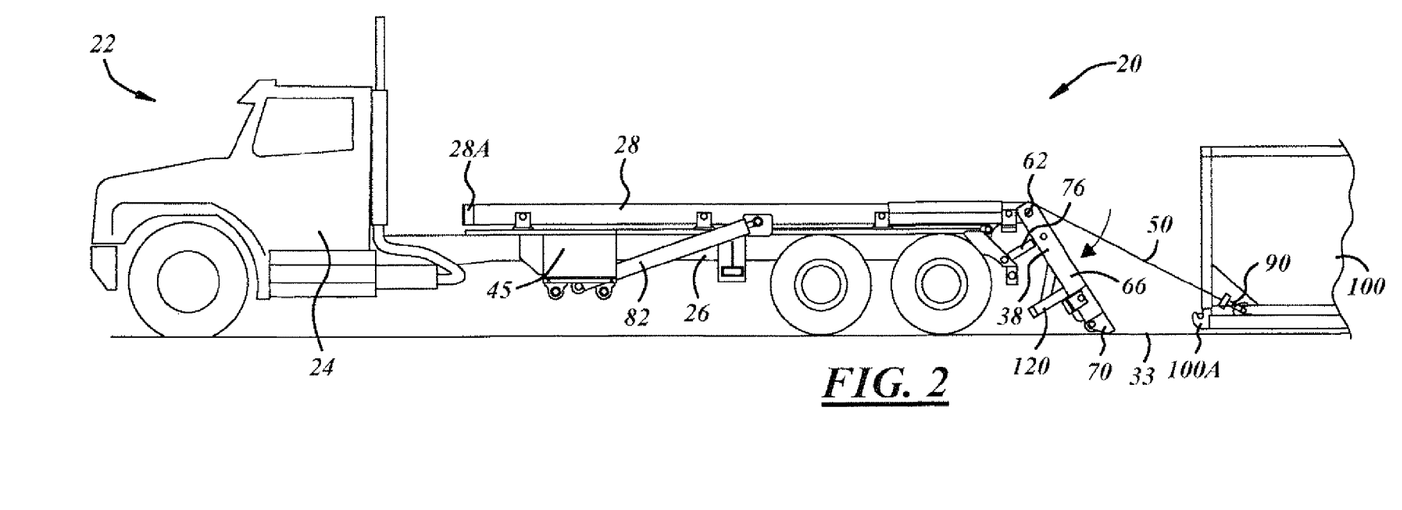
FIG. 2 is a side view of the system shown in FIG. 1 illustrating use of a cable hoist system.
Figure 5:
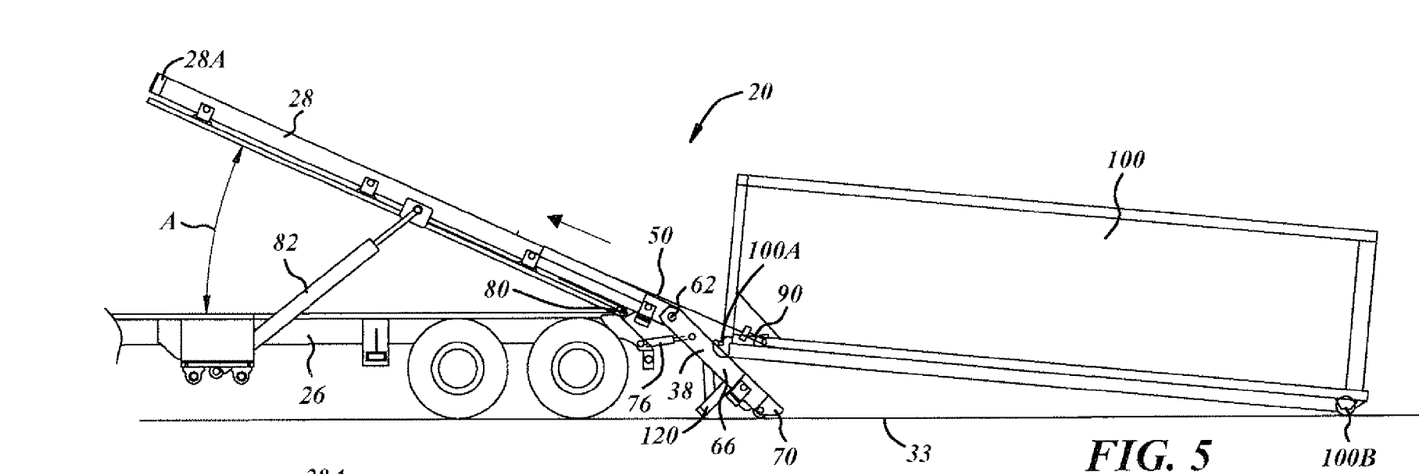
FIGS. 5 and 6 are additional side views of the system shown in FIGS. 1 and 2, illustrating a container being loaded onto a vehicle.

Once the cable 50 is attached to container 100, as shown in FIG. 2, the vehicle operator operates the dual hydraulic cylinder reeving system 40, causing the cylinders 42 and 44 to extend. FIG. 2 illustrates the beginning of a loading operation. As shown, the hinged tail member 38 has been rotated until the end member 70 and roller 71 are positioned on or near the ground or other surface 33. In addition, the hook or other attaching mechanism 90 has been attached to the container 100. Note that the operator can in some situations pull the containers onto the hinged tail without raising the tilt frame and with skill continue to load the containers all the way onto the tilt frame. Also, the operator can in some situations pull the container onto the hinged tail as shown in FIG. 5 with a combination of pulling the container forward and lifting the hinged tail 38 (i.e. by elevating the container by extending cylinder 76.) In this regard, in some instances, containers waiting to be loaded onto the vehicle are "frozen" to the ground and the lifting of hinged tail combined with pulling of cable 50 will effectively break the containers free. Another option for use with the present invention is to pull the container on the hinged tail member with the hinged tail at maximum angle to the surface 33. This hinge tail angle provides a steeper angle to load containers which minimizes the potential of the container jumping the side rail members. With the hinged tail at the maximum angle with surface 33, the resultant angular pull of cable 50 beyond pulley 60 provides greater vertical force and less horizontal force. The reduced horizontal component reduces forces which could cause a misaligned container to jump over the side rail members 66 and 68 on the hinged tail member.

FIG. 5 illustrates another step in the operation of loading the container 100 onto a vehicle. In this Figure, the tilt frame member 28 has been raised or tilted by activation of the hydraulic cylinders 82 and 84 and the front corner or end 100A of the container 100 has been pulled up onto the hinged tail member 38. The rotation or tilting of the tilt frame member 28 is illustrated by the angle A in FIGS. 5 and 6. With the present invention, the amount of angle A is discretionary with the operator.

As indicated above, it is also possible in some cases to load and unload containers without the necessity to raise the tilt frame member 28 at all. In these situations, the containers are lifted solely by the cable and the hinged tail member. This is substantially the same as the "dead lift container" vehicles.

By not having to raise the tilt frame member to the extent necessary with conventional tilt frame vehicles, the present invention allows the loading and unloading of containers in a significantly faster manner. This increases the number of trips a vehicle operator can perform in a shift and thus lowers costs and increases revenues.

Figure 6:
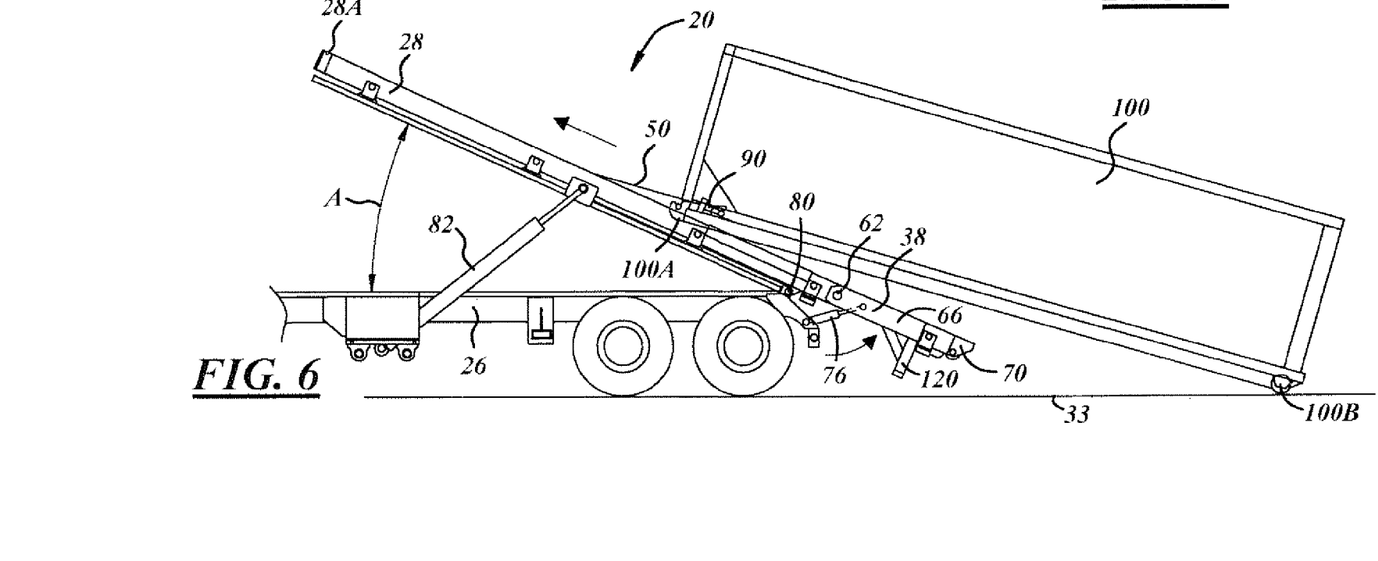

As the hydraulic cylinders 42 and 44 are extended, the cable 50 is shortened. This reduces the length of the free end of the cable 50 and thus pulls the container onto the elongated body. Because the cable 50 is attached near the front end of the elongated body and has a fixed length, when the dual hydraulic cylinder reeving arrangement 40 extends the cylinders 42 and 44, the container is pulled onto the elongated body. A further intermediate step in the loading of a container 100 onto the elongated body is shown in FIG. 6.

Figure 7:
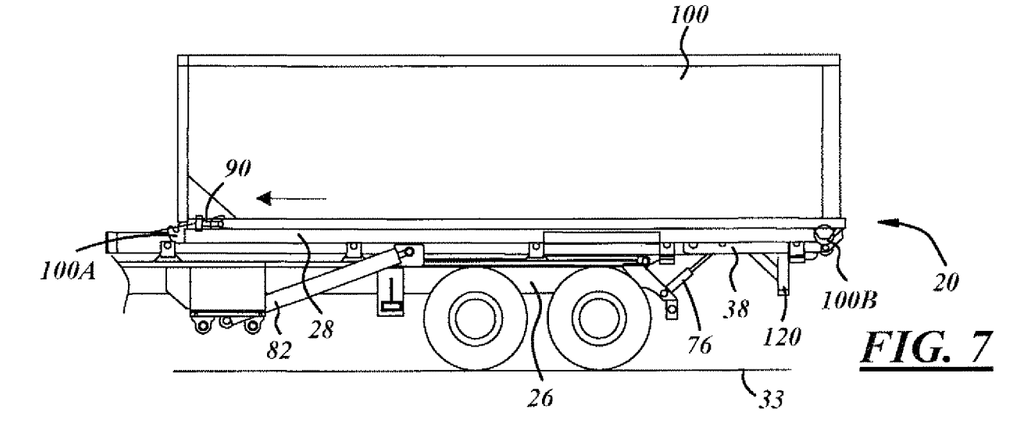
FIG. 7 is a side view showing a container fully loaded on a vehicle.

Once the container 100 is positioned at the front of the elongated body, the container is fully positioned on it. This is shown in FIG. 7. At this time, or shortly before, the hydraulic cylinders 82 and 84 are activated lowering the tilt frame member 28 until it rests horizontally on the bed or frame 26 of the vehicle. Also, the hydraulic cylinder 76 may be activated which rotates the hinged tail member 38 back to its position in alignment with the tilt frame member 28.

The precise sequence of operation of the tilting of the tilt frame member, the activation of the reeving arrangement 40, and/or the return of the hinged tail member to its rest position, is not critical. There is no requirement that each cylinder or set of cylinders be operated in a serial fashion and it is well within the scope of the invention that the cylinders be operated simultaneously, or in any other manner which is convenient to the operator.

The present invention is particularly useful for loading and unloading containers where there is a low ceiling or type of obstruction which prevents the elongated body from being rotated or tilted to an extent necessary to load or unload a container without a hinged tail member. With conventional tilt frame mechanisms, the tilt frame is typically rotated from the bed or frame of the vehicle until the rear end of the tilt frame is positioned on the ground. In order to accomplish this, the hydraulic cylinders conventionally rotate the tilt frame to an angle A of approximately 40-50°. Conventional fixed length tilt frame members in use today are on the order of 22-24 feet in length. In this manner, the forward end 28A of the tilt frame member 28 will be tilted to a position well above the height of the cab of the vehicle. With the present invention, the angle A for hoists with hinged tail members during loading and unloading is considerably less, on the order of 0-20°.

Preferably, the center line for the base of the cylinder 76 which operates the hinged tail member 38, is on the same center line as the pivot member 80 for the tilt frame member on the vehicle frame. Thus, preferably the two center lines are coincident. This arrangement allows the operator to lower the tail member only partially and then maintain the same angled relationship with the tilt frame member when the tilt frame member is raised.

The side rail members 66 and 68 on the hinged tail member 38 allow the optional use of L-shaped locking members (not shown) to assist in securing containers on the tilt frame member during transport. The locking members can be positioned on the inside of the rail members 66, 68 and are used to secure a container 25 to the tilt frame 28 once the container is loaded onto it. (In an alternate embodiment, the locking members can be positioned on the outside of the rail members 66 and 68.) The locking members are pivotally attached to the rail members and are hydraulically actuated. The locking members hook over the lower tubular members, or the lower flanges on the I-beams or L-shaped beams, which are positioned on the bottom of most containers.

The locking members are commonly called "hold-down" devices but also can be used to assist in loading containers. Providing them on the hinged tail member minimizes or eliminates the problem with conventional tilt frame vehicles which need to load containers at steep lifting angles. The steep angles often cause the containers to "jump" the rails when being loaded. The locking members provide greater reliability and safety.

Also, in accordance with the preferred embodiment of the present invention, the hinged tail member 38 has a bumper member 120 attached to it. The member 120 meets the rear device requirements of the U.S. Department of Transportation ("DOT"). Often, the required rear devices are "in the way" when loading containers or when emptying containers when surface 33 is uneven and covered with debris. In these situations, conventional rear devices often become damaged when the tilt frame member rises and the bumper device is pushed into the debris on the ground. Having the rear device 120 attached to the hinged tail member minimizes or eliminates this problem and also provides greater reliability and safety.

Figure 11:
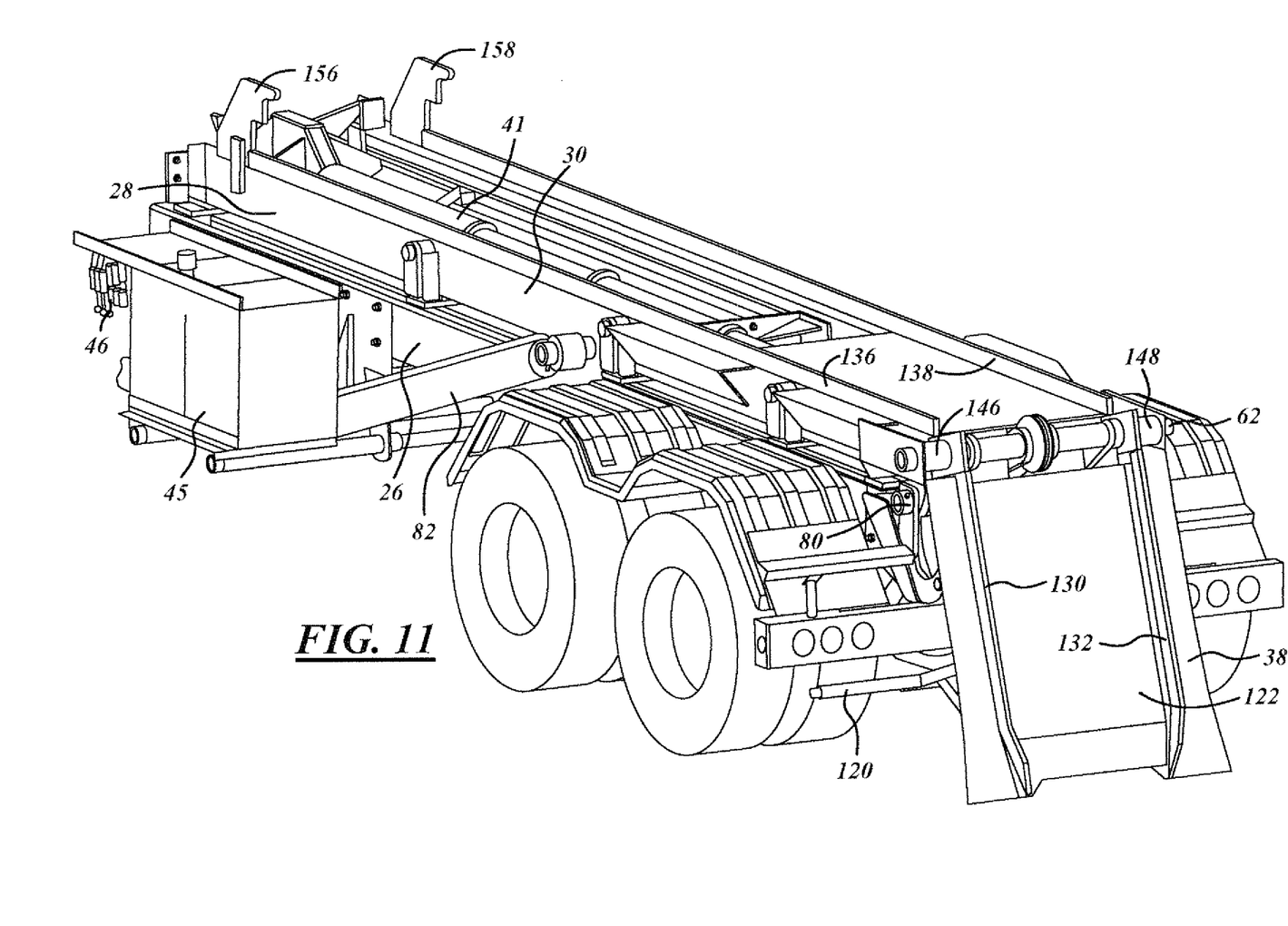
FIG. 11 is a perspective view of a tilt frame trailer in accordance with another embodiment of the invention.
Figure 12:
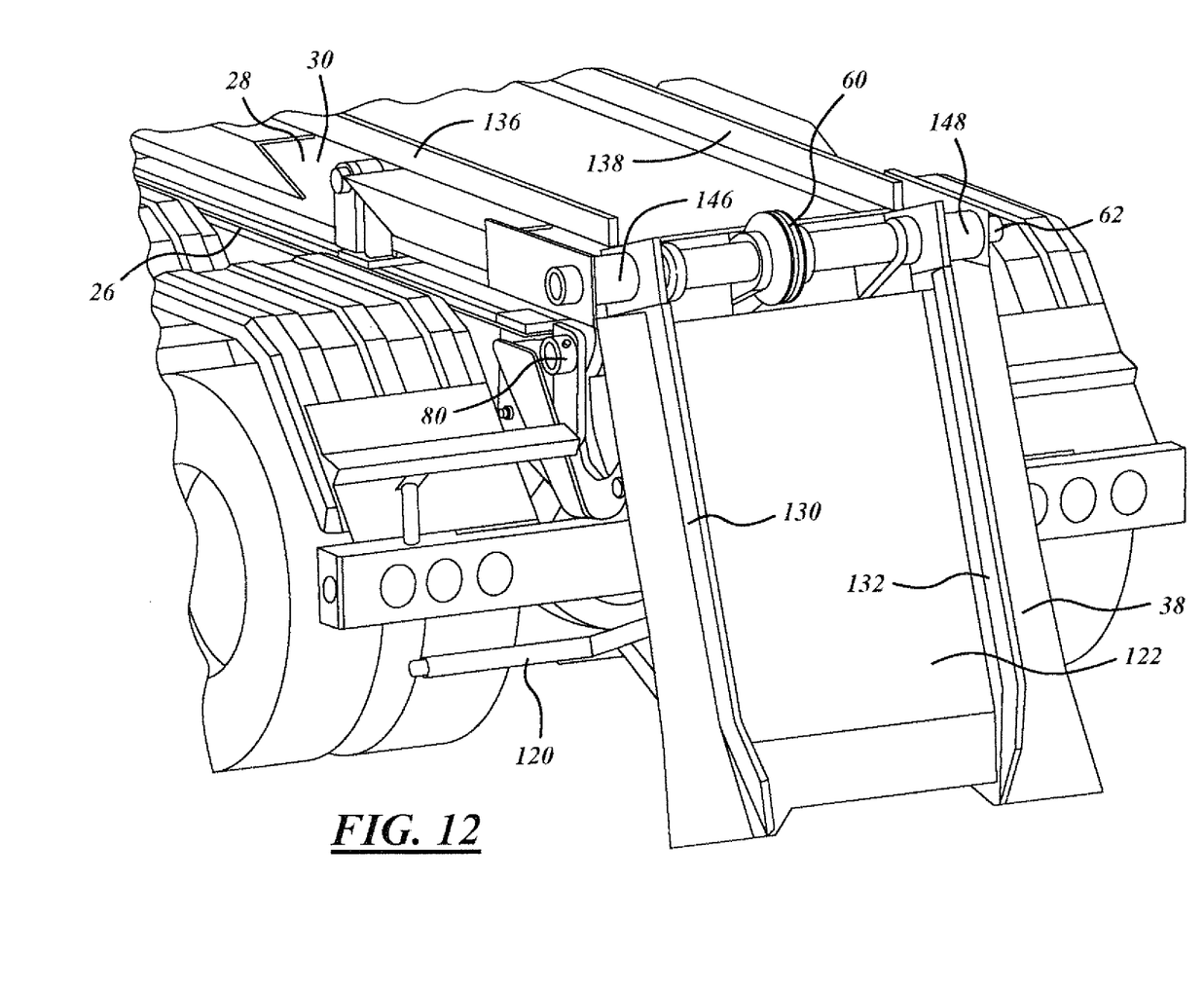
FIG. 12 is an enlarged perspective view of a hinged tail member in accordance with an embodiment of the invention.

The dual hydraulic cylinder reeving arrangement is positioned below the plane of the top of the side rails 30, 32 of the tilt frame so that the extensible arm members of the hydraulic cylinders can travel the length of the tilt frame. Also, as mentioned above, it is possible to use other reeving mechanisms and arrangements on the tilt frame member in order to hook onto and load and unload containers. For example, a single hydraulic cylinder reeving arrangement 41 could be utilized (as shown in FIG. 11). Other conventional cable hoisting systems could also be utilized.

In order to protect the hinged tail hydraulic cylinder 76 from damage due to unwanted movement of a container during loading or unloading, a plate member 122 can be attached to hinged tail member 38. This embodiment is shown in FIGS. 3, 9, 11 and 12. The plate member is preferably made of a steel sheet metal or similar strong and durable material.

As indicated, the tilt frame member 28 includes a pair of elongated side frame (rail) members 30 and 32 and a plurality of cross-frame members 170, 171, 172, 173 and 174, as shown in FIG. 3. The dual hydraulic cylinder reeving arrangement 40 is positioned between the side frame members and is used to extend and retract the cable 50 in order to load and unload containers on and off the transport vehicle.

The tail member 38 preferably has a square or rectangular structure formed by frame members 66, 68, and 70, although it can have any polygonal configuration. Additional cross brace member 72 is optional. It is also possible to provide the tail member 38 with a larger width than the tilt frame member 28. (The width of the tail member is depicted by the dimension W in FIG. 9.)

A rear light bar member 180 is also provided on the vehicle frame. Various safety reflectors and tail lights 181-182 are typically provided on it.

The tilt frame member 28 and hinged tail member 38 are operated to load and unload containers in substantially the same manner as discussed above. The operation of the dual cylinder reeving arrangement 40 extends and retracts the cable 50 which in turn is used to load and unload containers or other structures onto and off from the transport vehicle. The hinged tail member 38 is used either by itself or as an aid in the loading and unloading operations. The hinged tail member is also load bearing in the transport position.

As shown in FIG. 11, a pair of container guide members 130, 132 can be provided on the hinged tail member 38. The guide members are used to assist in guiding the containers on and off the vehicle in a better and straighter manner. The guide members 130 and 132 help prevent containers from sliding off or on the vehicle at an angle to the longitudinal axis of the vehicle.

Similarly, a pair of elongated guide members 136, 138 can be positioned on the side rail members 30 and 32. These guide members 136 and 138 assist in guiding the containers properly along the tilt frame members. The guide members prevent the containers from sliding along the tilt frame members in an angled manner.

To assist in the loading and unloading of the containers in an easier manner, roller members 146 and 148 are provided on the pivot member 62.

Figure 8:
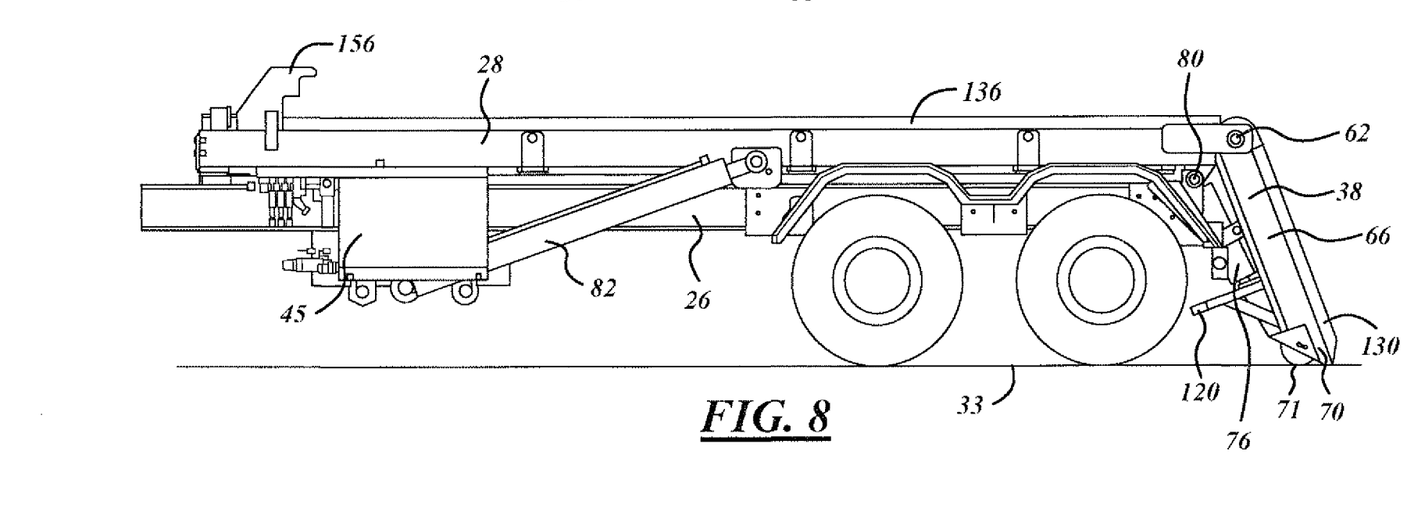
FIG. 8 is a side view of a tilt frame member having a hinged tail member in the lowered position.
Figure 9:
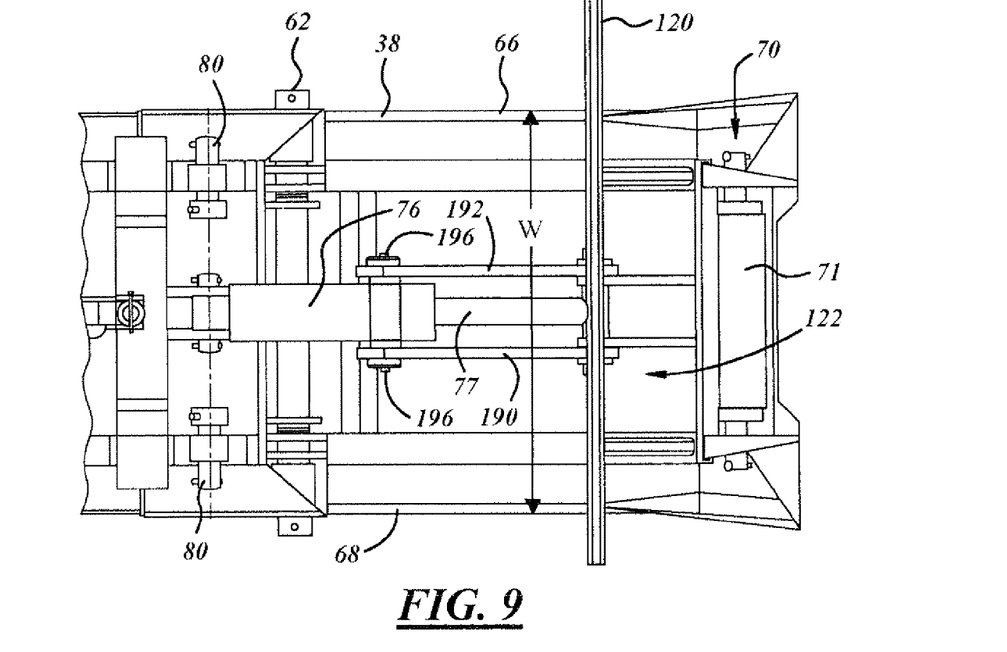
FIG. 9 illustrates the underside of a hinged tail member.

Front hold down members 156 and 158 can be provided on the front ends of the side rail members 30 and 32 adjacent the vehicle cab. These are shown in FIGS. 8 and 11. The hold down members are used to secure (or "hold" down) the front ends 100A of the containers 100 when they are positioned on the vehicle for transport.

Figure 10:
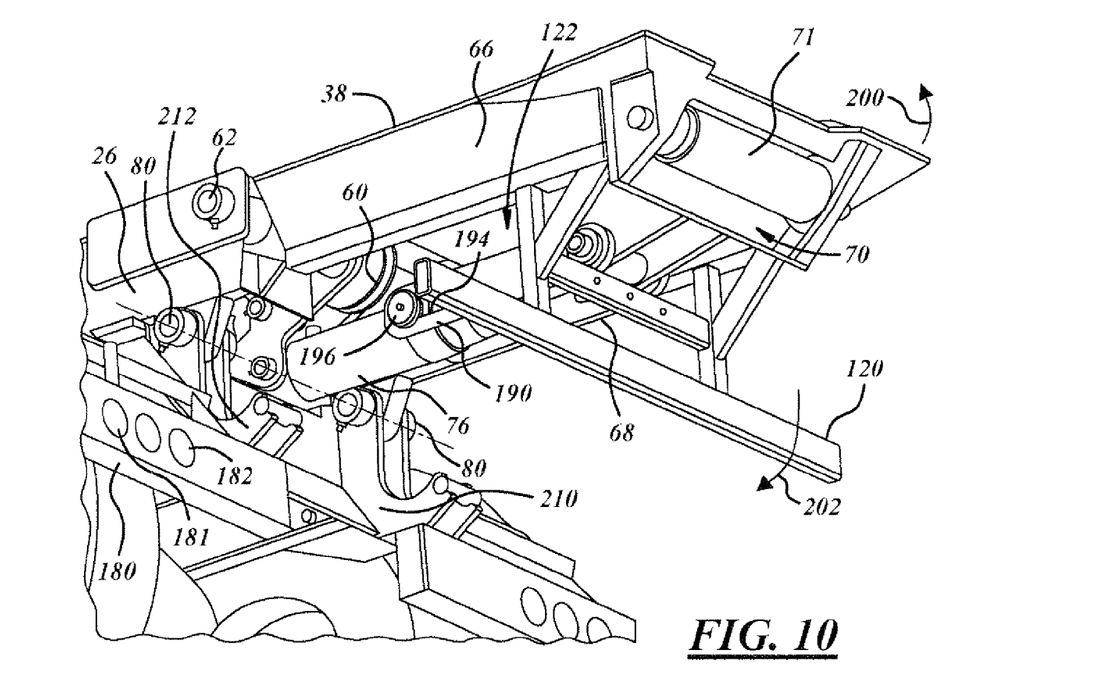
FIG. 10 is a perspective view of a hinged tail member in accordance with an embodiment of the invention.

In order to prevent the hinged tail member 38 from being rotated or forced into a position above the plane of the tilt frame member, or into a position where it has been rotated beyond its maximum lowered position, two safety systems are provided. One or two side plate members 190, 192 are provided along the side of the hydraulic cylinder 76 which actuates the hinging of the tail member 38. See FIGS. 9 and 10. The plate members 190, 192 have a slot 194 which limits the extent to which the arm member 77 of the hydraulic cylinder 76 can be extended. Post members 196 are attached to the hydraulic cylinder and are positioned in the slot 194. As the arm member 77 is extended, the post member 196 moves along the slot. When the post member 196 reaches the point shown in FIGS. 9 and 10, the hinged tail member cannot be raised any higher. This limits the rotation of the hinged tail member in the direction 200 (FIG. 10). The plate members, post members and slots are dimensioned to prevent the hinged tail member 38 from being rotated in direction 200 past the plane of the tilt frame member 28.

Stop members 210 and 212, as shown in FIG. 10, are provided to limit the downward rotation of the hinged tail member 38. The stop members are attached to the vehicle frame member 26 and are positioned to contact the bottom of side rail members 66 and 68 and prevent any further rotation in the direction of arrow 202. The stop members 210 and 212 prevent over-rotation of the hinged tail member when, for example, the vehicle is pushed or backed up when the tail member is positioned in its maximum lowered position.

In the maximum lowered position of the hinged tail member, the roller member 71 should be in contact with the ground 33. This is shown in FIG. 8. The roller 71 allows the hinged tail member to roll on the ground if the vehicle is backed up when the hinged tail member is in its maximum lowered position.

While preferred embodiments of the present invention have been shown and described herein, numerous variations and alternative embodiments will occur to those skilled in the art. Accordingly, it is intended that the invention is not limited to the preferred embodiments described herein, but instead is limited to the terms of the appended claims.

What is claimed is:

1. A system for loading and unloading containers onto and off from a transport vehicle comprising:
   an elongated tilt frame member pivotally attached to a transport vehicle, the tilt frame member including a pair of continuously rigid side rails extending from a forward end positioned adjacent a cab of the transport vehicle to a rear end, the rear end positioned behind all vehicle wheels, and during loading and unloading of a container onto and off of the transport vehicle, the forward end of the tilt frame moves upward while the rear end of the tilt frame moves downward;
   a dual cylinder reeving arrangement, including a cable, positioned on the tilt frame member for loading and unloading containers onto and off from the transport vehicle; and
   a hinged tail member pivotally attached to the tilt frame member at its rear end and positioned behind all vehicle wheels;
   wherein said tail member can be rotated between a first position in alignment with said tilt frame member and a second position lowered to contact the ground and when the tail member is at a maximum angle with respect to the rear end of the elongated tilt frame in the second position, a resultant angular pull of the cable provides a greater vertical pulling force and less horizontal pulling force on the container being loaded onto the elongated tilt frame.

2. The system as described in claim 1 further comprising:
   a first hydraulic mechanism for rotatably tilting said tilt frame member and a second hydraulic mechanism for rotatably moving said hinged tail member between said first and second positions.

3. The system as described in claim 2 further comprising means for limiting the rotation of said hinged tail member.

4. The system as described in claim 3 wherein said means comprises slotted plate members positioned adjacent said second hydraulic mechanism.

5. The system as described in claim 3 wherein said means comprises stop members for limiting rotation of said hinged tail member toward the ground.

6. The system as described in claim 1 wherein said tail member is rotatably connected to said tilt frame member by a pivot member and wherein a cable pulley is positioned on said pivot member.

7. The system as described in claim 1 further comprising a protective plate member positioned on said hinged tail member.

8. The system as described in claim 1 further comprising at least one hold down member on said hinged tail member.

9. The system as described in claim 1 further comprising guide members positioned on said hinged tail member for guiding containers there along.

10. The system as described in claim 1 wherein the pivot of said tilt frame member is coaxial with the pivot of said hinged tail member.

11. The system as described in claim 1 further comprising roller members on said pivot of said hinged tail member.

12. A system for loading and unloading containers onto and off from a transport vehicle comprising:
an elongated tilt frame member rotatably attached to a transport vehicle, the tilt frame member including a pair of continuously rigid side rails extending from a forward end positioned adjacent a cab of the transport vehicle to a rear end, the rear end positioned behind all vehicle wheels, and during loading and unloading of a container onto and off of the transport vehicle, the forward end of the tilt frame moves upward while the rear end of the tilt frame moves downward;
a single cylinder reeving arrangement, including a cable, positioned on the tilt frame member for loading and unloading containers onto and off from the transport vehicle; and
a hinged tail member pivotally attached to the tilt frame member at its rear end and positioned behind all vehicle wheels;
wherein said tail member can be rotated between a first position in alignment with said tilt frame member and a second position lowered to contact the ground and when the tail member is at a maximum angle with respect to the rear end of the elongated tilt frame in the second position, a resultant angular pull of the cable provides a greater vertical pulling force and less horizontal pulling force on the container being loaded onto the elongated tilt frame.

13. The system as described in claim 12 further comprising:
a first hydraulic mechanism for rotatably tilting said tilt frame member and a second hydraulic mechanism for rotatably moving said hinged tail member between said first and second positions.

14. The system as described in claim 12 wherein said tail member is rotatably connected to said tilt frame member by a pivot member and wherein a cable pulley is positioned on said pivot member.

15. The system as described in claim 12 further comprising a protective plate member positioned on said hinged tail member.

16. The system as described in claim 12 further comprising at least one hold down member on said hinged tail member.

17. The system as described in claim 12 further comprising guide members positioned on said hinged tail member for guiding containers therealong.

18. The system as described in claim 12 further comprising means for limiting the rotation of said hinged tail member.

19. The system as described in claim 12 wherein said means comprises slotted plate members positioned adjacent said second hydraulic mechanism.

20. The system as described in claim 12 wherein said means comprises stop members for limiting rotation of said hinged tail member toward the ground.

21. The system as described in claim 12 wherein the pivot of said tilt frame member is coaxial with the pivot of said hinged tail member.

22. The system as described in claim 12 further comprising roller members on said pivot of said hinged tail member.

23. A method for loading and unloading containers onto and off from a transport vehicle comprising:
a. providing an elongated tilt frame member including a pair of continuously rigid side rails extending from a forward end positioned adjacent a cab of the transport vehicle to a rear end, the tilt frame rotatably attached to a transport vehicle;
b. providing a tail member pivotably attached to the rear end of the elongated tilt frame member by a pivot member and being actuated by at least one hydraulic cylinder, said tail member being behind all wheels of the vehicle and rotatable between a first position in alignment with said tilt frame member and a second position lowered toward the ground, and during loading and unloading of a container onto and off of the transport vehicle, the forward end of the tilt frame moves upward while the rear end of the tilt frame moves downward;
c. providing a hydraulic cylinder reeving arrangement on said tilt frame member for connecting to containers, said reeving arrangement having a cable member;
d. actuating pivotal rotation of said tail member from said first position to assist in loading or unloading containers;
e. connecting said cable member of said hydraulic cylinder reeving arrangement to a container; and
f. activating said hydraulic cylinder reeving arrangement to assist in loading or unloading a container onto said tail member and said tilt frame member and when the tail member is at a maximum angle with respect to the rear end of the elongated tilt frame in the second position, a resultant angular pull of the cable provides a greater vertical pulling force and less horizontal pulling force on the container being loaded onto the elongated tilt frame.

24. The method as described in claim 23 wherein said tail member is rotated back to said first position for transport.

25. The method as described in claim 23 further comprising the step of rotating said tilt frame member.

26. The method as described in claim 23 further comprising activating said hydraulic cylinder reeving arrangement to pull a container onto said hinged tail member.

27. The method as described in claim 26 wherein said hydraulic cylinder reeving arrangement comprises a dual cylinder reeving arrangement.

28. The method as described in claim 26 wherein said hydraulic cylinder reeving arrangement comprises a single cylinder reeving arrangement.

29. The method as described in claim 23 further comprising actuating said hydraulic cylinder reeving arrangement and rotating said tail member in order to load or unload containers.

* * * * *

UNITED STATES PATENT AND TRADEMARK OFFICE
CERTIFICATE OF CORRECTION

| | |
|---|---|
| PATENT NO. | : 8,444,365 B2 |
| APPLICATION NO. | : 12/476767 |
| DATED | : May 21, 2013 |
| INVENTOR(S) | : Charles Duell et al. |

It is certified that error appears in the above-identified patent and that said Letters Patent is hereby corrected as shown below:

In the Specification:

Column 2
Line 66, "a k/a" should be --a/k/a--

Column 4
Line 15, "body" should be --body,--

Signed and Sealed this
Twenty-seventh Day of August, 2013

Teresa Stanek Rea
*Acting Director of the United States Patent and Trademark Office*